No. 875,138. PATENTED DEC. 31, 1907.

C. UMBACH.
TELEPHONE TRANSMITTER.
APPLICATION FILED FEB. 8, 1907.

Witnesses:
Fred C. Davison
G. Filippi

Inventor:
Chris Umbach
By Barton, Tanner & Fock,
Attys.

UNITED STATES PATENT OFFICE.

CHRISTIAN UMBACH, OF NEW YORK, N. Y., ASSIGNOR TO WESTERN ELECTRIC COMPANY, OF CHICAGO, ILLINOIS, A CORPORATION OF ILLINOIS.

TELEPHONE-TRANSMITTER.

No. 875,138.

Specification of Letters Patent.

Patented Dec. 31, 1907.

Application filed February 8, 1907. Serial No. 356,399.

*To all whom it may concern:*

Be it known that I, CHRISTIAN UMBACH, citizen of the United States, residing at New York, in the county of New York and State of New York, have invented a certain new and useful Improvement in Telephone-Transmitters, of which the following is a full, clear, concise, and exact description.

My invention relates to telephone transmitters, and more particularly to that type of transmitter in which the resistance button is mounted at an angle with relation to the diaphragm.

The object of my invention is to provide improved means for connecting the stem of the movable electrode to the diaphragm.

In practice it has in some cases been found desirable to mount the button at an angle to the diaphragm instead of with its face in the usual parallel relation thereto. In such cases it has been the practice, in order to properly clamp the diaphragm in position, to provide a bent or angular stem or stud for the movable electrode, so that said stem may meet the diaphragm at right angles and may be secured thereto in the usual manner. Such ordinary means of securing the diaphragm to the angular stem of the button is unsatisfactory by reason of the trouble encountered in making the parts meet at exactly right angles.

By my invention the diaphragm can readily be adjusted in proper position whether or not the stem of the electrode meets it at an exact right angle.

Figure 1:
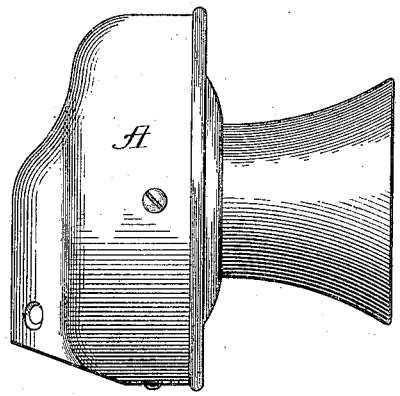
Figure 2:
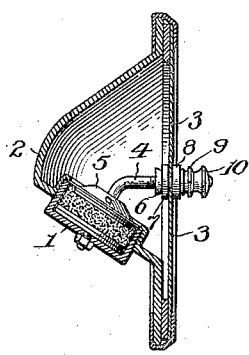

My invention may be readily understood by reference to the accompanying drawings, in which, Figure 1 is a side elevation showing the exterior of the casing of a transmitter embodying my invention; Fig. 2 is a section of the working parts of the transmitter; and Figs. 3 and 4 are enlarged fragmentary sections, showing the means for securing the stem of the electrode to the diaphragm.

Similar letters of reference designate similar parts in each of the figures of the drawings.

The button 1 is mounted upon the bridge 2 in the usual way, the method of mounting and the position of said button with relation to the diaphragm 3 being clearly indicated in Fig. 2. The button 1 is of a well known form, and, as is customary, has the stem 4 of the movable electrode 5 secured to the diaphragm 3.

Figure 3:
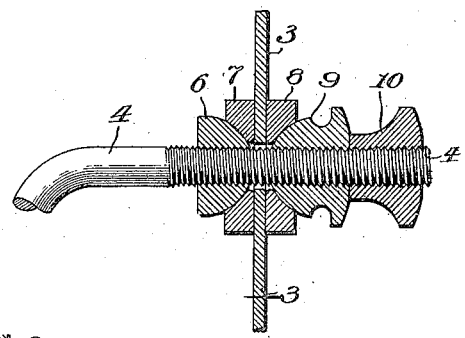
Figure 4:
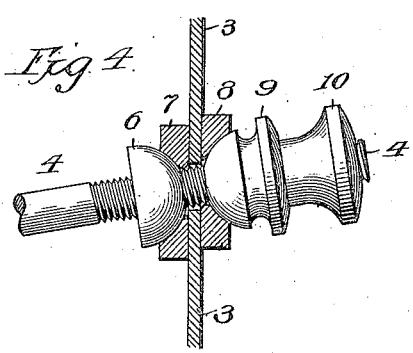

The stud 4 is angular or bent so that it may meet the diaphragm at approximately right angles, and the means for securing the diaphragm to said stud is most clearly shown in Figs. 3 and 4. In said Figs. 3 and 4 the stud is shown as meeting the diaphragm at right and oblique angles, respectively, and projecting loosely through an opening in said diaphragm. In neither case, however, is the diaphragm placed under any strain which might prevent a proper operation of the parts.

In assembling the parts a nut 6 having a round or semi-spherical head is first threaded on the stem 4. Between said nut and the diaphragm is placed a washer 7 having a concavity or socket on its surface corresponding to the rounded head of said nut. The diaphragm is then fastened to the circular rim of the bridge plate 2 in the usual manner. A washer 8 and nut 9, similar in construction to the washer 7 and nut 6, respectively, are then secured in position to rigidly secure the diaphragm to the stem. An additional securing nut 10 may also be employed.

As is apparent from Fig. 4, in case the stem 4 is not exactly at right angles to the diaphragm the parts will automatically adjust themselves so that the diaphragm is properly clamped, and is free from strain which might interfere with the proper operation of the parts.

The working parts shown in Fig. 2 are held in the outer case A in the usual manner.

I claim:

1. In a telephone transmitter, a button provided with a movable electrode having a stud projecting therefrom, a diaphragm, means for supporting said button and diaphragm, and means for securing said diaphragm to said stud, said means being self-adjusting to adapt itself to the angle at which the stud and diaphragm are assembled 2. In a telephone transmitter, a button provided with a movable electrode having an angular stud projecting therefrom, a diaphragm, means for supporting said button and diaphragm in angular relation to each other, said diaphragm having an opening through which said stud projects, and means for securing said diaphragm to said stud, said means being self-adjusting to adapt itself to the angle at which the stud and diaphragm are assembled.

3. In a telephone transmitter, a button provided with a movable electrode having an angular stud projecting therefrom, a diaphragm, means for supporting said button and diaphragm in angular relation to each other, said diaphragm having an opening through which said stud projects, and a ball and socket clamping means for securing said diaphragm to said stud.

4. In a telephone transmitter, a button provided with a movable electrode having a stud projecting therefrom, a diaphragm, means for supporting said button and diaphragm, said diaphragm having an opening through which said stud loosely projects, a washer upon each side of said opening, said washers each having a concave seat or socket upon its outer face, and a pair of opposing nuts for clamping said diaphragm in place, said nuts each having a rounded head fitting in the socket of the corresponding washer.

5. In a telephone transmitter, a button provided with a movable electrode having an angular stud projecting therefrom, a diaphragm, means for supporting said button and diaphragm in angular relation to each other, said diaphragm having a central opening through which said stud loosely projects, a washer upon each side of said opening, said washers each having a concave seat or socket upon its outer face, and a pair of opposing nuts for clamping said diaphragm between said washers, said nuts each having a rounded head fitting in the socket of the corresponding washer.

In witness whereof, I, hereunto subscribe my name this 31st day of January, A. D., 1907.

CHRIS. UMBACH.

Witnesses:
G. F. ATWOOD,
GEO. F. GETCHINS.